United States Patent
Blaisdell et al.

(10) Patent No.: US 8,326,974 B2
(45) Date of Patent: *Dec. 4, 2012

(54) TYPICALITY FILTERING OF EVENT INDICATORS FOR INFORMATION TECHNOLOGY RESOURCES

(75) Inventors: Russell C. Blaisdell, Austin, TX (US); John Michael Lake, Cary, NC (US); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 777 days.

This patent is subject to a terminal disclaimer.

(21) Appl. No.: 12/349,569

(22) Filed: Jan. 7, 2009

(65) Prior Publication Data

US 2009/0106777 A1  Apr. 23, 2009

Related U.S. Application Data

(63) Continuation of application No. 10/801,211, filed on Mar. 16, 2004, now Pat. No. 7,496,660.

(51) Int. Cl.
  *G06F 15/173* (2006.01)
(52) U.S. Cl. ............ 709/224; 719/318; 726/22
(58) Field of Classification Search .......... None
  See application file for complete search history.

(56) References Cited

U.S. PATENT DOCUMENTS

| | | | | |
|---|---|---|---|---|
| 5,619,716 | A | | 4/1997 | Nonaka et al. ......... 395/800 |
| 5,732,275 | A | | 3/1998 | Kullick et al. ......... 395/712 |
| 5,913,218 | A | | 6/1999 | Carney et al. ......... 707/200 |
| 6,009,274 | A | | 12/1999 | Fletcher et al. ......... 395/712 |
| 6,026,139 | A | * | 2/2000 | Hady et al. ......... 377/13 |
| 6,029,196 | A | | 2/2000 | Lenz ......... 709/221 |
| 6,282,546 | B1 | | 8/2001 | Gleichauf et al. ......... 707/102 |
| 6,308,559 | B1 | * | 10/2001 | Davison ......... 73/114.39 |
| 6,405,318 | B1 | | 6/2002 | Rowland ......... 726/22 |
| 6,463,454 | B1 | | 10/2002 | Lumelsky et al. ......... 718/105 |
| 6,853,950 | B1 | | 2/2005 | O'Reilly et al. ......... 702/179 |
| 7,124,272 | B1 | * | 10/2006 | Kennedy et al. ......... 711/173 |
| 2002/0184568 | A1 | * | 12/2002 | Kurrasch ......... 714/39 |

(Continued)

FOREIGN PATENT DOCUMENTS

| | | |
|---|---|---|
| EP | 0864972 | 9/1998 |
| JP | 10320338 A | 12/1998 |
| JP | 11095989 A | 4/1999 |

OTHER PUBLICATIONS

Allan, R. et al. "Dynamic Update of an Application Monitoring Agent Using a Non-Polling Mechanism," IBM Patent Application Dossier, Filed May 31, 2000, U.S. Appl. No. 09/583,958.

(Continued)

*Primary Examiner* — Ario Etienne
*Assistant Examiner* — Clayton R Williams
(74) *Attorney, Agent, or Firm* — Winstead, P.C.

(57) ABSTRACT

A monitor for information technology resources improved by introducing typicality filters to analyze potential event indicators such as alerts. A typicality filter keeps a time-dependent history of the frequency of occurrence of an associated event, wherein time is segmented into monitoring periods. At the end of each monitoring period, a present count of occurrences of the event is determined, and compared with the numbers of occurrences of that event in a subset of monitoring periods read from the history. If the present count exceeds the number of occurrences of the event in a predetermined proportion of the subset of historical monitoring periods, a first action is invoked; otherwise, a second action is invoked.

11 Claims, 5 Drawing Sheets

U.S. PATENT DOCUMENTS

| | | | |
|---|---|---|---|
| 2003/0084323 A1 | 5/2003 | Gales | 713/200 |
| 2003/0101260 A1 | 5/2003 | Dacier et al. | 709/224 |
| 2003/0110398 A1 | 6/2003 | Dacier et al. | 713/201 |
| 2004/0010718 A1 | 1/2004 | Porras et al. | 713/201 |
| 2006/0173992 A1 | 8/2006 | Weber et al. | 709/224 |

OTHER PUBLICATIONS

IBM Technical Disclosure Bulletin, "System Performance Monitor for Data Acquisition, Data Analysis, and System Recommendations," vol. 39, Pub. No. 9, pp. 19-22, Sep. 1996.

* cited by examiner

FIG. 3B

History Table for October 10

|  | Oct. 9 | Oct. 8 | Oct. 7 | Oct. 6 | Oct. 5 |
|---|---|---|---|---|---|
| 02:00 | 0 | 0 | 2 | 1 | 1 |
| 02:05 | 1 | 1 | 1 | 0 | 1 |
| 02:10 | 1 | 1 | 2 | 0 | 1 |
| 02:15 | 0 | 1 | 0 | 1 | 0 |
| 02:20 | 0 | 1 | 0 | 1 | 0 |
| 02:25 | 0 | 1 | 0 | 1 | 0 |

FIG. 3A

History table for day K

| | Day | | | |
|---|---|---|---|---|
| | K-1 | K-2 | ... | K-M |
| $T_1$ | $h_{1,K-1}$ | $h_{1,K-2}$ | ... | $h_{1,K-M}$ |
| $T_2$ | $h_{2,K-1}$ | $h_{2,K-2}$ | ... | $h_{2,K-M}$ |
| . | . | . | . | . |
| . | . | . | . | . |
| . | . | . | . | . |
| $T_N$ | $h_{N,K-1}$ | $h_{N,K-2}$ | ... | $h_{N,K-M}$ |

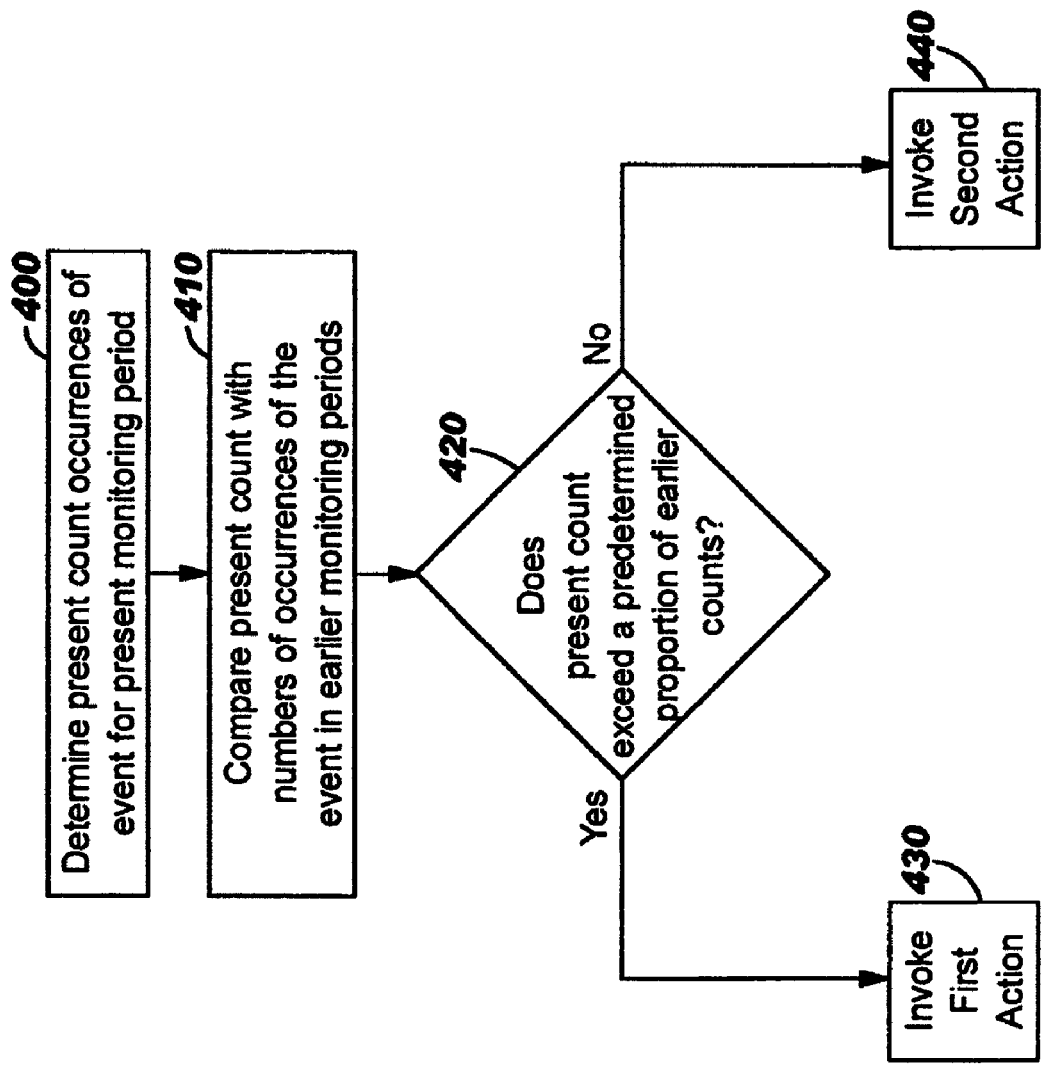

TYPICALITY FILTERING OF EVENT INDICATORS FOR INFORMATION TECHNOLOGY RESOURCES

CROSS REFERENCE TO RELATED APPLICATIONS

The present application is a continuation application of pending U.S. patent application Ser. No. 10/801,211, which was filed on Mar. 16, 2004, which is assigned to the assignee of the present invention. The present application claims priority benefits to U.S. patent application Ser. No. 10/801,211.

FIELD OF THE INVENTION

The invention relates generally to the field of monitoring information technology resources, and more particularly to the field of filtering event indicators such as alerts.

BACKGROUND

As computer equipment has become increasingly complex, the difficulty in monitoring this equipment to keep it functioning properly has become formidable. For example, a server attached to a network should be monitored to ensure that the hardware and software do not malfunction, to ensure that adequate resources such as memory and disk space are available during peak use times, to protect the server from electronic vandalism such as hacking that arrives over the network, and so forth.

As shown in FIG. 1, a monitored device 100 such as a server may be watched over by a monitor 110. The monitor 110 may sense traffic received and transmitted over a network 120 as well as sense conditions both internal and peripheral to the monitored device 100 such as memory use and disk occupancy, CPU utilization, power supply state, cabinet temperature, and numerous other measures of health.

To accomplish these purposes, the monitor 110 typically includes various sensors 111. Here, the term "sensor" is not confined to simple hardware devices, nor is it necessary that the sensors reside literally within the monitor 110. Rather, the term is intended to encompass both software and hardware systems for sensing the state of parameters that have importance with regard to the proper operation of the monitored device 110. Thus, in correspondence with the examples just mentioned, the monitor 110 may include a sensor that is an intrusion detection system that works in conjunction with protective equipment 130 such as a firewall, another for sensing memory use, yet another for sensing disk occupancy, and so forth. Typically, each sensor determines the state of associated parameters, which state is then evaluated.

Evaluation may involve the use of persistence filters 112. In a simple case, a persistence filter may compare the state determined by the corresponding sensor with a preestablished threshold. If the state violates the threshold, the filter generates an event indicator such as an alert. For example, if the cabinet temperature exceeds ninety degrees Celsius, an alert may be generated. In other cases, the decision process may be more complex as to whether an event indicator should be generated, and if so, what the nature of the indicator should be. For example, a critical alert might be generated if the remaining disk space is determined to be less than 10 MB, a warning alert generated if the remaining disk space is between 10 MB and 25 MB, and an informational alert generated if more than 25 MB remains.

The resulting event indicators may be sent to an event console 140, which may be operated by a human operator 150, or which may be autonomic. The event console 140 or the human operator 150 determine appropriate actions to invoke in response to the event indicators.

Although the configuration of FIG. 1 is now widely used, it suffers from a significant disadvantage: the operating point of the persistence filters 112 must be set as a compromise that minimizes the generation of both false positives and false negatives. Here, a false positive occurs when an event indicator is generated in response to an unimportant state. Typically, the human operator 150 exercises independent judgment and may decline to invoke a response to a false positive. On the other hand, a false negative occurs when an event is not generated despite the existence of a critical state that requires attention.

Because false negatives are generally more damaging than false positives, there is a tendency to configure the persistence filters to err on the side of permissiveness, thus potentially subjecting the event console 140 and the operator 150 to a flood of false positives. At some point, however, false positives begin to inflict their own damage by disrupting the operation of the monitored device 100 with unneeded protective measures, or by desensitizing the operator 150 to the arrival of critical alerts, i.e., true positives. Thus there is a need to improve the performance of information technology resource monitors in a way that minimizes the generation of false positives and false negatives, while preserving the capability of the monitor to unfailingly generate true positives when conditions warrant.

SUMMARY

The present invention improves the performance of a monitor for information technology resources by introducing typicality filters to analyze events that have the potential to trigger the generation of event indicators such as alerts. In one embodiment of the invention, a typicality filter keeps a time-dependent history of the numbers of occurrences of an associated event, wherein time is segmented into monitoring periods. At the end of each monitoring period, the number of occurrences of the associated event is determined, and compared with the number of occurrences of that event in a subset of the historical monitoring periods. If the number of occurrences of the event in the present monitoring period exceeds the number of occurrences of the event in a predetermined proportion of the historical monitoring periods in the specified subset, for example a majority of the members of the subset, a first action is invoked; otherwise, a second action is invoked.

BRIEF DESCRIPTION OF THE DRAWINGS

FIGS. 3A and 3B show exemplary history tables suitable for use by a typicality filter.

FIG. 4 is a flowchart that shows operational aspects of a typicality filter.

DETAILED DESCRIPTION

Figure 1:
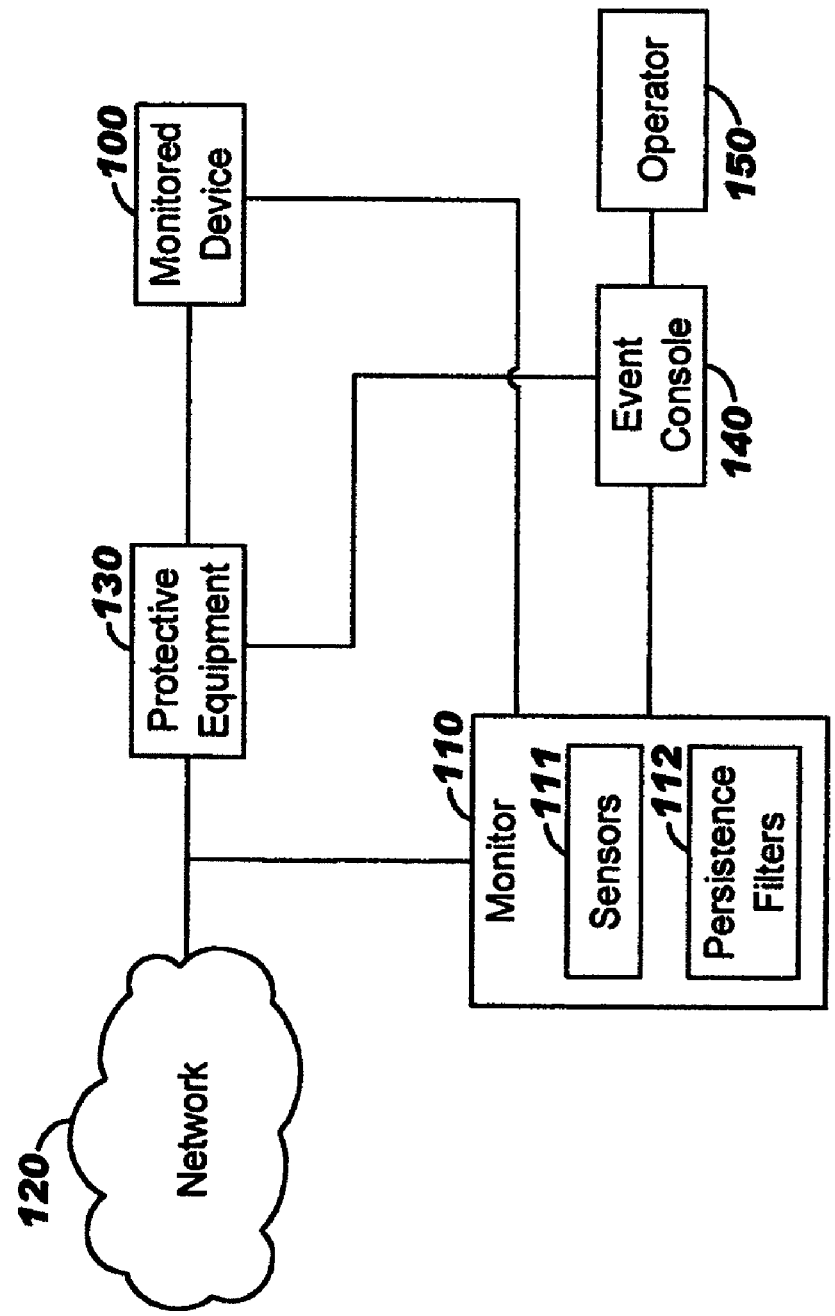
FIG. 1 is used for background discussion.
Figure 2:
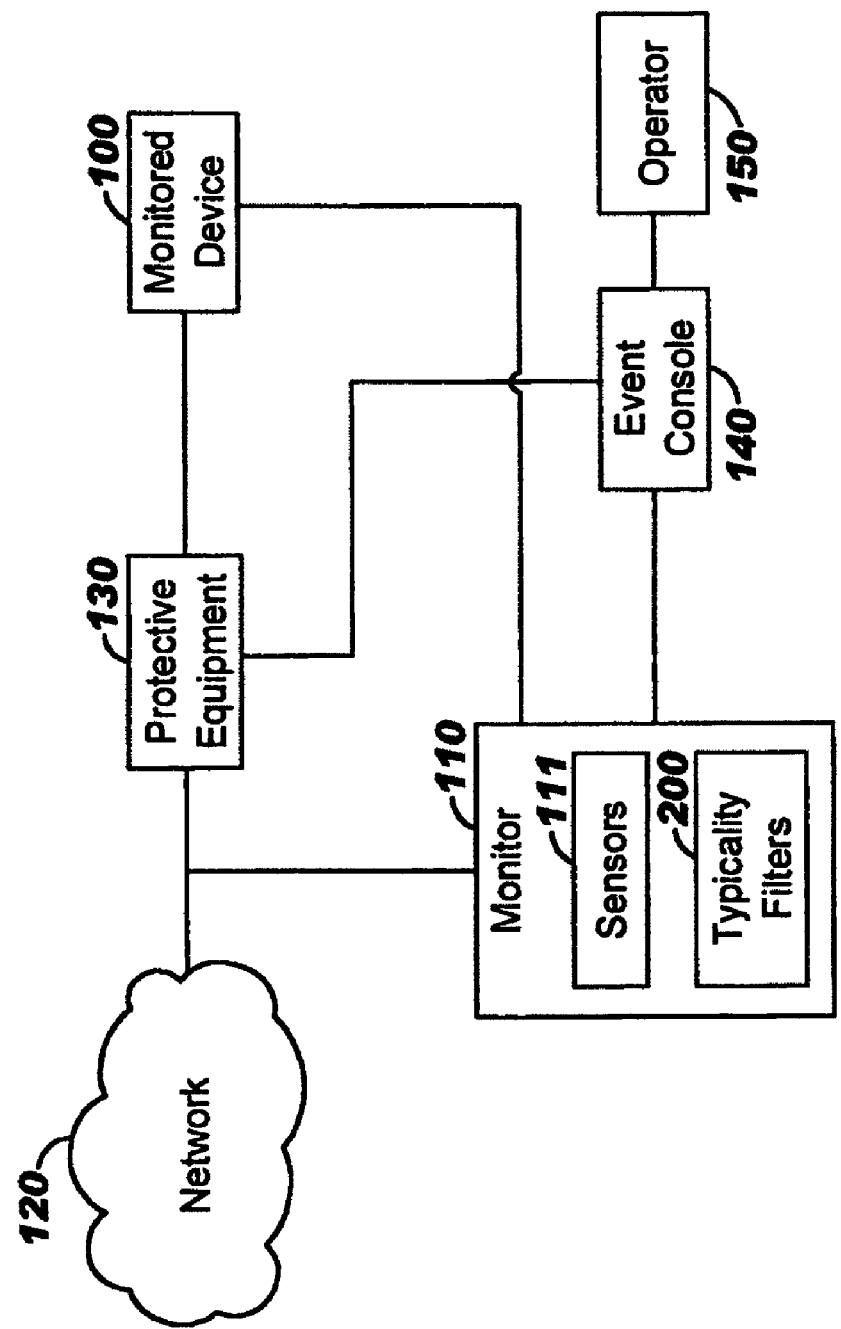
FIG. 2 shows a configuration that includes typicality filters according to the present invention.

The present invention improves the performance of monitors for information technology resources, such as monitor 110 shown in FIG. 1, by introducing typicality filters to analyze events and act on the results of the analysis. FIG. 2 shows a configuration that includes typicality filters according to the present invention. The configuration of FIG. 2 is essentially the same as the configuration of FIG. 1, where like numbers indicate like elements, excepting that FIG. 2 shows the use of typicality filters 200 rather than persistence filters 122, thereby improving the performance of the monitor 110.

For a given kind of event, an associated typicality filter keeps a time-dependent history of the numbers of occurrences of the event. The history encompasses a window of time. For example, in a preferred embodiment, the history spans five days. These days need not be consecutive, however. For example, the five days may be the last five business days, or the last five Mondays, and so forth.

In the operation of a typicality filter, time is segmented into monitoring periods. In a preferred embodiment, these periods are each five minutes long. Thus an exemplary history may encompass 288 such periods per day, for five days, giving a total of 1440 historical monitoring periods. For convenience, entries of the history may be organized as shown in FIG. 3A, where a history table 300 is constructed as a matrix having N rows, where N is the number of monitoring periods per day, and M columns, where M is the number of days in the history. Let the present day be day K. The columns then represent days K-1 through K-M.

FIG. 3B shows a few elements of an exemplary history table 300'. In this example, the present day is October 10, and the columns correspond, from left to right in FIG. 3B, to October 9 through October 5. The exhibited rows of the history table 300' correspond, from top to bottom, to the monitoring periods beginning at 02:00, 02:05, 02:10, 02:15, 02:20, and 02:25 Universal Time. The history tables 300 and 300' are introduced here as aids to explaining the invention rather than limitations of the invention. The history may, of course, be stored and arranged in any other convenient way as well as in the way illustrated by FIGS. 3A and 3B.

In this illustrative embodiment, entries of the history table 300 are the observed numbers of occurrences of the associated event during the indicated monitoring periods on the indicated days. As a running example, suppose that the event is the arrival of an inbound packet bearing a certain origination address thought to belong to a hacker. Suppose that during the monitoring period beginning at 02:10, one such packet was detected on October 5, 8, and 9, two such packets were detected on October 7, and none on October 6. Putting these numbers in chronological order from most recent to least recent gives the row (1, 1, 2, 0, 1), which corresponds to the 02:10 row of the history table 300' shown in FIG. 3B, which table is intended for use on October 10. In this way, history tables may be constructed and updated day by day.

FIG. 4 shows operational aspects of a typicality filter, with reference to the configuration of FIG. 2 and the history table 300 of FIG. 3A.

At the end of the present monitoring period, the number of occurrences of the associated event is determined (step 400). This is called here the present count. The present count may correspond to the number of occurrences of the event over the course of the present monitoring period, or may aggregate counts of the event over a plurality of monitoring periods. The present count is then compared with the numbers of occurrences of that event in a subset of the monitoring periods from the history table 300 (steps 410, 420). In a preferred embodiment of the invention, the subset consists of the same monitoring period on the five most recent days. Continuing with the running example introduced above, suppose that the present day is October 10, that the present monitoring period began at 02:10, and that the event in question occurred once during that monitoring period, giving a present count of one.

This occurrence of one is then compared with the entries (1, 1, 2, 0, 1) as described above with respect to history table 300', for the five previous days.

The result of the comparison is determined by whether or not the present count exceeds a predetermined proportion of the counts of occurrences of the event observed in the subset of the monitoring periods. In a preferred embodiment, the predetermined proportion is a simple majority. Thus, in the running example, the count of one on October 10 in the monitoring period that began at 02:10 is compared by majority vote with the counts for the monitoring periods begin at 02:10 on the previous five days, i.e., (1, 1, 2, 0, 1).

If the present count exceeds the number of occurrences of the event for the predetermined proportion of the monitoring periods of the historical subset, the count of events is judged to be atypical, and a first action is invoked (step 430); otherwise, the count is judged to be typical, and a second action is invoked (step 440). Thus, in the running example, the count of one occurrence is judged to be typical, whereas a hypothetical count of two occurrences of the event would be judged to be atypical, despite the historical observance of two occurrences of the event on October 7 during the monitoring period beginning at 02:10.

Again with reference to the running example, which concerns the arrival of packets bearing an origination address thought to belong to a hacker, the first action (step 430), which corresponds to an atypical situation, may be to instruct the protective equipment 130 to block incoming packets that bear the origination address in question, and the second action may be to log the arrival of the packet but take no further action at that time. These actions, however, are only examples used to illustrate operational aspects of the invention; the invention encompasses a wide variety of actions that would be known to those skilled in the art of network and resource management.

Figure 5:
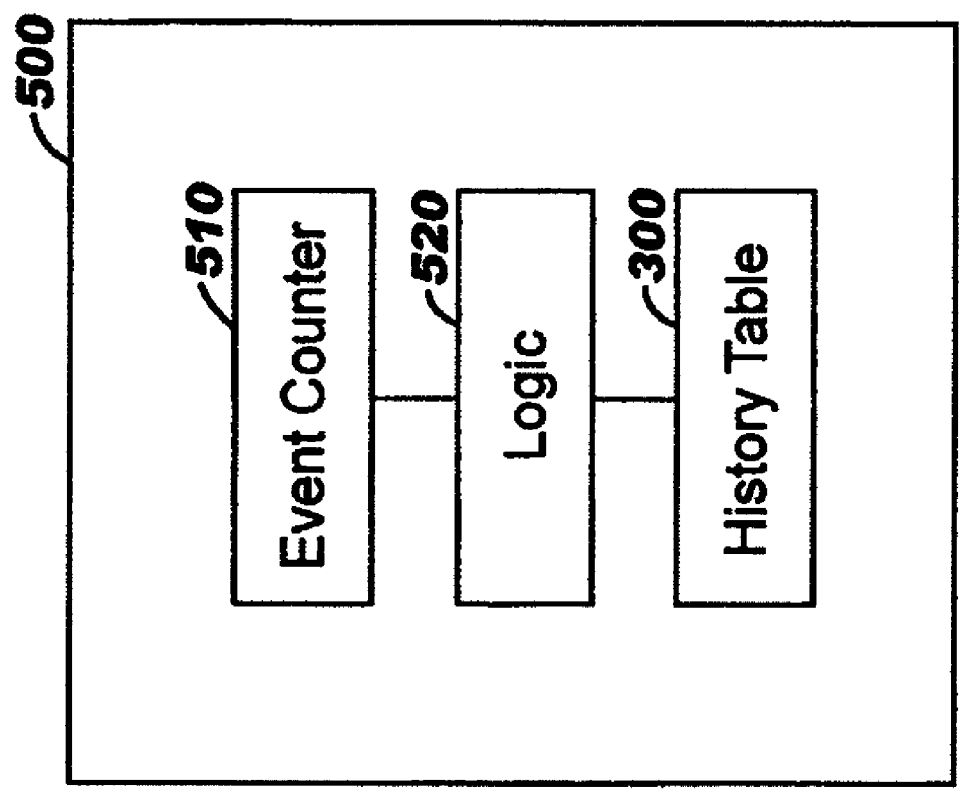
FIG. 5 shows an exemplary typicality filter.

The invention also includes the typicality filter apparatus. An exemplary typicality filter is shown in FIG. 5. The typicality filter 500 comprises an event counter 510 for determining the present count of the number of occurrences of an event; a history table 300 as described above; and logic 520 for comparing the present count with numbers of occurrences of the event in a plurality of earlier monitoring periods selected from the history table 300, invoking a first action if the present count exceeds a predetermined proportion of the numbers of occurrences of the event in the plurality of earlier monitoring periods, and invoking a second action if the present count does not exceed the predetermined proportion of the numbers of occurrences of the event in the plurality of earlier monitoring periods.

In a preferred embodiment, the typicality filter 500 may be implemented using a memory and a programmable processor operating according to stored program control instructions, for example a microprocessor.

Thus the present invention improves the performance of the monitor 110 by using a simple technique that takes into account the history of events experienced by the monitored device. The foregoing description of the invention is illustrative rather than limiting, however, and the invention is limited only by the claims appended here.

We claim:

1. A computer program product embodied in a computer readable storage device for filtering events in an information technology resource monitor, the computer program product comprising the programming instructions for:

determining a present count of occurrences of an event for a present monitoring period;

comparing the present count with numbers of occurrences of the event in a plurality of earlier monitoring periods;

invoking a first action if the present count exceeds a predetermined proportion of the numbers of occurrences of the event in the plurality of earlier monitoring periods; and invoking a second action if the present count does not exceed the predetermined proportion of the numbers of occurrences of the event in the plurality of earlier monitoring periods.

2. The computer program product as recited in claim 1, wherein the predetermined proportion is a majority.

3. The computer program product as recited in claim 1, wherein the second action includes logging the present count without taking further corrective action.

4. The computer program product as recited in claim 1, wherein the plurality of earlier monitoring periods all begin at the same times on consecutive days previous to the present monitoring period.

5. A typicality filter implemented using a processor operatively coupled to a memory, wherein the typicality filter is suitable for filtering events in an information technology resource monitor, said filter comprising:

an event counter for determining a present count of occurrences of an event for a present monitoring period;

a history table for storing numbers of occurrences of the event in earlier monitoring periods; and logic for comparing the present count with numbers of occurrences of the event in a plurality of earlier monitoring periods selected from the history table, invoking a first action if the present count exceeds a predetermined proportion of the numbers of occurrences of the event in the plurality of earlier monitoring periods, and invoking a second action if the present count does not exceed the predetermined proportion of the numbers of occurrences of the event in the plurality of earlier monitoring periods.

6. The typicality filter as recited in claim 5, wherein the predetermined proportion is a majority.

7. The typicality filter as recited in claim 5, wherein the second action includes logging the present count without taking further corrective action.

8. The typicality filter as recited in claim 5, wherein the plurality of earlier monitoring periods all begin at the same times on consecutive days previous to the present monitoring period.

9. A method suitable for filtering events in an information technology resource monitor, the method comprising the steps of:

determining, by an event counter in a typicality filter, a present count of occurrences of an event for a present monitoring period;

comparing the present count with numbers of occurrences of the event in a plurality of earlier monitoring periods;

invoking a first action if the present count exceeds a predetermined proportion of the numbers of occurrences of the event in the plurality of earlier monitoring periods; and invoking a second action if the present count does not exceed the predetermined proportion of the numbers of occurrences of the event in the plurality of earlier monitoring periods.

10. The method as recited in claim 9, wherein the predetermined proportion is a majority.

11. The method as recited in claim 9, wherein the second action includes logging the present count without taking further corrective action.

* * * * *